R. Porter.
Wheels in Channels.
No. 8219X
Patented May 24, 1834.
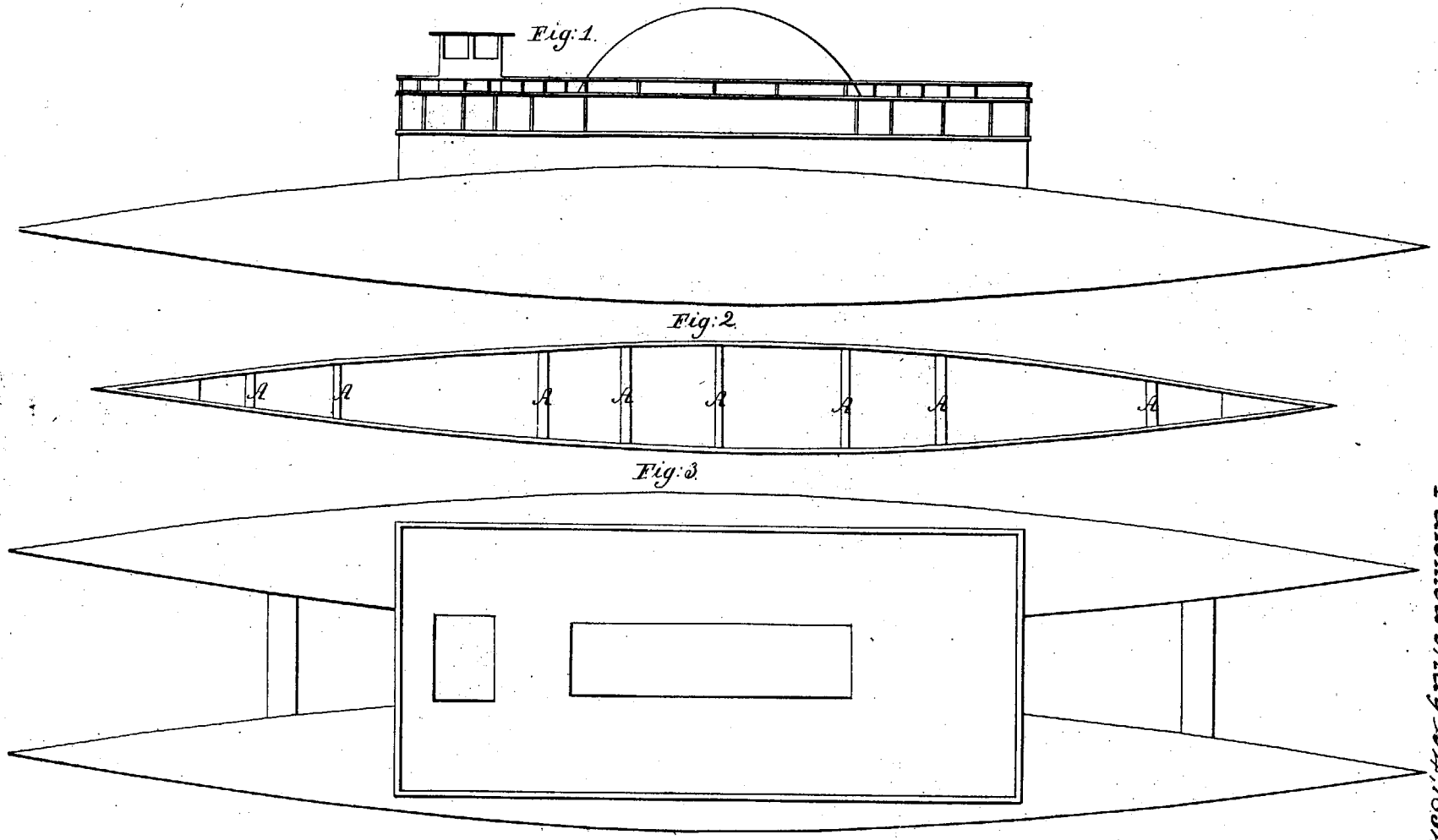
R. PETERS, PHOTO-LITHOGRAPHER, WASHINGTON, D. C.

May 24. 1834 9

Rufus Porter of Billerica, Mass. 8219X

Letters Patent (May 24, 1834)

The Schedule referred to in these Letters Patent & making part of the same, containing a description in the words of the said Rufus Porter himself of his improvement in Boats.

---

To all to whom these presents shall come, Be it known that I, Rufus Porter, of Billerica in the County of Middlesex, & State of Massachusetts have invented a new & useful improvement in boats, and that the following is a full and exact description of the construction of the said Boat, as invented by me —

This boat is made in the shape or form, which may be denominated a pointed spheroid being swelled in the centre, but tapering gradually to a point at each end, being made on a principle similar to that of a cask and consisting of long pointed staves or planks which are fastened by both spikes or screws, to circular timbers, which are fixed at convenient & suitable distances and are of various diameters, being larger near the centre of the boat but smaller towards the ends, so that each plank may conform to a uniform curve from point to point. The proportion of the length of the boat to the diameter thereof should be as twenty to one, but may be varied as circumstances may require. The principal mode in which I contemplate using boats of the above description is to place two such boats parallel to each other and at such a distance from each other as shall be equal to one tenth of the length of each boat securing them in that situation by means of beams extending across & from one boat to the other (the ends of each beam being firmly secured to each boat) which support a deck or floor, on which may be erected machinery for propelling these boats cabins for passengers &c. The paddle wheel (in case the boats are propelled by steam or horse power) being placed between the two boats, which however when they connected together with the deck &c. are considered as constituting but one complete boat, nevertheless, in some cases, the single boat would be preferable.

The point which I claim as original in this invention is the peculiar shape or form of each single boat, applied as above, whether solid or hollow —

Witnesses
Daniel M. Frye
[illegible] Allen

Rufus Porter

[illegible]